United States Patent [19]

Eisenberg et al.

[11] Patent Number: 5,553,237

[45] Date of Patent: Sep. 3, 1996

[54] SAFETY CRITICAL MONITORING OF MICROPROCESSOR CONTROLLED EMBEDDED SYSTEMS

[75] Inventors: Alan J. Eisenberg, Monmouth Junction, N.J.; Alexander M. Adelson, Peekskill, N.Y.; James A. Eby, Pennington, N.J.

[73] Assignee: Base Ten Systems, Inc., Trenton, N.J.

[21] Appl. No.: 354,971

[22] Filed: Dec. 13, 1994

[51] Int. Cl.$^6$ .................................................. G06F 11/00
[52] U.S. Cl. .............................. 395/184.01; 395/183.02; 395/185.02
[58] Field of Search .................. 395/185.02, 185.04, 395/185.1, 183.07, 183.13, 184.01, 183.02, 905, 906, 907, 908, 913, 914, 915, 916

[56] References Cited

U.S. PATENT DOCUMENTS

| | | | |
|---|---|---|---|
| 4,649,515 | 3/1987 | Thompson et al. | 395/183.02 |
| 4,799,159 | 1/1989 | Davidson et al. | 395/184.01 |
| 4,815,076 | 3/1989 | Denney et al. | 395/183.02 |
| 4,888,771 | 12/1989 | Benignus et al. | 395/183.02 |
| 4,922,491 | 5/1990 | Coale | 395/183.02 |
| 4,984,239 | 1/1991 | Suzuki et al. | 395/183.07 |
| 5,123,017 | 6/1992 | Simpkins et al. | 395/183.02 |
| 5,163,052 | 11/1992 | Evans et al. | 395/183.07 |
| 5,218,196 | 6/1993 | Dogul at el. | 395/185.04 |
| 5,339,261 | 8/1994 | Adelson et al. | 395/184.01 |
| 5,347,646 | 9/1994 | Hirosawa et al. | 395/185.02 |

OTHER PUBLICATIONS

Bradely et al., "Practical Formal Development Of Real Time Systems", IEEE, Proc. 11th Workshop on Real Time Systems, pp. 44–8.

Bowen et al., "Safety critical Systems, Formal Methods and Standards", Software Eng. Journal vol. 8, Iss. 4 pp. 189–209.

Michel et al., "A New Approach To Control Flow Checking Without Program Modification", Fault Tolerant computing, 1991, IEEE, pp. 334–41.

Cin et al., "Error Detection Mechanisms For Massively Parallel Multiprocessors", Euromicro Workshop on Parallel & Dist. Comp. 1993, pp. 401–08.

cHENG, "Design Of Knowledge–Based Expert Systems For Real Time Critical Applications", Tencon, 1994, IEEE, pp. 86–90.

*Primary Examiner*—Robert W. Beausoliel, Jr.
*Assistant Examiner*—Joseph E. Palys
*Attorney, Agent, or Firm*—Sprung Horn Kramer & Woods

[57] ABSTRACT

A safety critical monitoring system and method for a microprocessor controlled embedded system has application specific program logic including a defined set of safety critical rules for the application system corresponding to criteria for safety critical operations to be performed by the central processing unit in accordance with the application specific program logic. The operating system or central processing unit is linked to the stored set of safety critical rules for verifying that the safety critical operations performed in accordance with the application specific program logic meet the criteria set by the safety critical rules.

22 Claims, 4 Drawing Sheets

SAFETY CRITICAL MONITORING OF MICROPROCESSOR CONTROLLED EMBEDDED SYSTEMS

BACKGROUND OF THE INVENTION

The present invention relates to microprocessor controlled embedded systems and, in particular, to the safety critical monitoring thereof.

Microprocessor controlled embedded systems are prevalent in medical devices, such as MRI imaging systems, blood testing equipment, etc., where it is now necessary to provide a safety critical environment for the protection of patients. As shown in FIG. 1, in a typical embodiment the system 2 sits between the specific application system 1 and an application specific user interface 3. In systems of this type, as shown in more detail in FIG. 2, application specific program logic resides permanently within a static memory 8 (non-volatile ROM or RAM). Along with the application specific program logic, the system includes an embedded operating system which is either a single process executive or multi-tasking executive system. The operating system is responsible for controlling the system interrupts, input/output control and the scheduling of the specific application tasks on a time or performance basis. The operating system operates with the microprocessor 5 which is part of the central processing unit of the system along with a random access memory and an input/output circuit 7 which communicate on a bus 6.

The application specific program logic is responsible for performing all functional operations, as well as for directly handling input and output of the information and control required for the specific application system utilizing the embedded system. The operating system is a stand-alone program or set of programs with a specifically defined interface for connecting it to the application specific program logic. The application specific program logic has the required interface logic to link it with the operating system. In conventional embedded systems, the operating system has no knowledge of the performance requirements of the application specific program logic or the specific application system, but simply acts as the controller for the central processing unit.

SUMMARY OF THE INVENTION

The main object of the present invention is to provide safety critical monitoring of a microprocessor controlled embedded system.

Another object of the present invention is to provide a safety critical operating system for insuring that specific application systems microprocessor controlled embedded systems fulfill their safety critical monitoring requirements.

A further object of the present invention is to provide a central processing unit which has a second microprocessor and performs safety critical operations as a transparent function in a microprocessor controlled embedded system for a specific application system.

The central processing unit is preferably a pin-for-pin replacement for a conventional central processing unit.

In accordance with the present invention, the safety critical operating system performs all of the standard embedded executive functions including at least one of multi-tasking, memory management, scheduling, exception handling, interrupt handling and supervisory level operations.

The safety critical operating system according to the present invention is a modified conventional or standard embedded operating system. The modifications comprise defining a link to a defined set of safety critical rules supplied with the application specific program logic, verifying that each operation associated with those rules is performed as defined and monitoring the application specific program logic in a time stealing mode to insure that the application specific program logic that is loaded is correct, that the use of the RAM is correct, that the operating program for the microprocessor operates as defined and that the application specific program logic is cycling.

In accordance with the present invention, the application specific program logic can be a modified version of conventional or standard embedded application specific program logic. The modification comprises the inclusion of a safety critical rule set and instructions for routing all outputs via the safety critical operating system. The safety critical operating system will insure that no outputs are modified except with its participation and in the case where the rules define a correlation between input and output, the safety critical operating system will monitor the associated inputs.

In accordance with the present invention, the safety critical rules include input/output limitations, input/output interactions (at the gross level), input/output timing, input/output feedback, operational calculations and application responses (stimulation/response).

A further feature of the present invention is the fact that the safety critical operating system is capable of responding to a failure by causing a system or user alert or alarm and by forcing a set of outputs into a rule defined level.

The safety critical operating system also performs all applicable testing of its own operation, so as to verify its own operation.

In another embodiment of the present application, the safety critical monitoring is carried out by a safety critical chip system which is preferably a pin-for-pin replacement for a conventional microprocessor package. The safety critical chip system contains a version of the conventional microprocessor along with at least one additional microprocessor having the function of a safety critical monitor of the standard microprocessor and the application specific program logic.

In this embodiment, the application specific program logic also includes the defined set of safety critical rules which is stored in memory and supplied to the safety critical chip system, which is capable of accessing all memory, as in the case of the conventional microprocessor, and additionally has enable and data control over all inputs and outputs to the application system via an input/output interface circuit. The safety critical chip system also preferably has an alarm output capability.

The safety critical chip system monitors the operating system and the application specific program logic in a transparent mode to insure that the operating system is the correct one, the application specific program logic is the correct one, the use of RAM is correct, the standard microprocessor operating program operates as defined, the application specific program logic is cycling and the operating system is cycling.

For this embodiment, the standard embedded application specific program logic need only be modified to include the safety critical rule set. The safety critical chip system will insure that no outputs are modified without its approval, and in the case where the rules define a correlation between input and output, the safety critical chip set will monitor the associated inputs.

The safety critical rules for this embodiment include all of those mentioned hereinabove for the previous embodiment.

The safety critical chip set is also capable of responding to a failure by causing a system or user alert or alarm and by forcing a set of outputs into a rule defined level.

The safety critical chip system similarly performs all applicable testing of its own operation in order to verify its own operation. The safety critical chip system, in order to carry out the safety critical monitoring, has the ability to request the conventional microprocessor, via an interrupt request, to perform an instruction and supply a result, it can request that the conventional microprocessor, via an interrupt, write and access the random access memory, it can inhibit the conventional microprocessor activity, it can inhibit outputs and it can force output levels, it can perform a cyclical redundancy check of the application specific program logic, the operating system and itself, it can verify that the application specific program logic and the operating system are cycling and it can perform self-testing.

Furthermore, the safety critical chip system, in cases where the outputs can require specific sequences which can occur in rapid succession or whose occurrence can cause significant safety problems, can cause the specific output to be connected via a controlled first-in first-out (FIFO) register allowing a delay between the application specific program logic output and the actual physical output to permit the safety critical chip system to validate the information without causing a disruption in the program sequence of activity. The FIFO register maintains the data and time of occurrence and insure that the sequential nature of the data is unchanged.

These and other objects and advantages of the present invention will be described in more detail with regard to the attached drawings wherein,

DETAILED DESCRIPTION OF THE INVENTION

Figure 1:
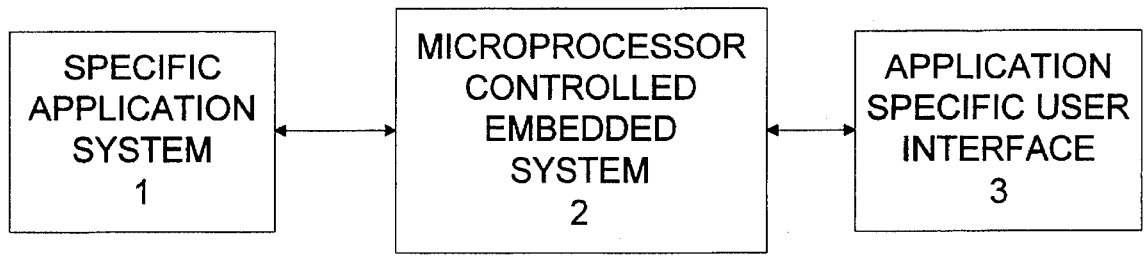
FIG. 1 is a block diagram of a prior art microprocessor controlled embedded system.
Figure 2:
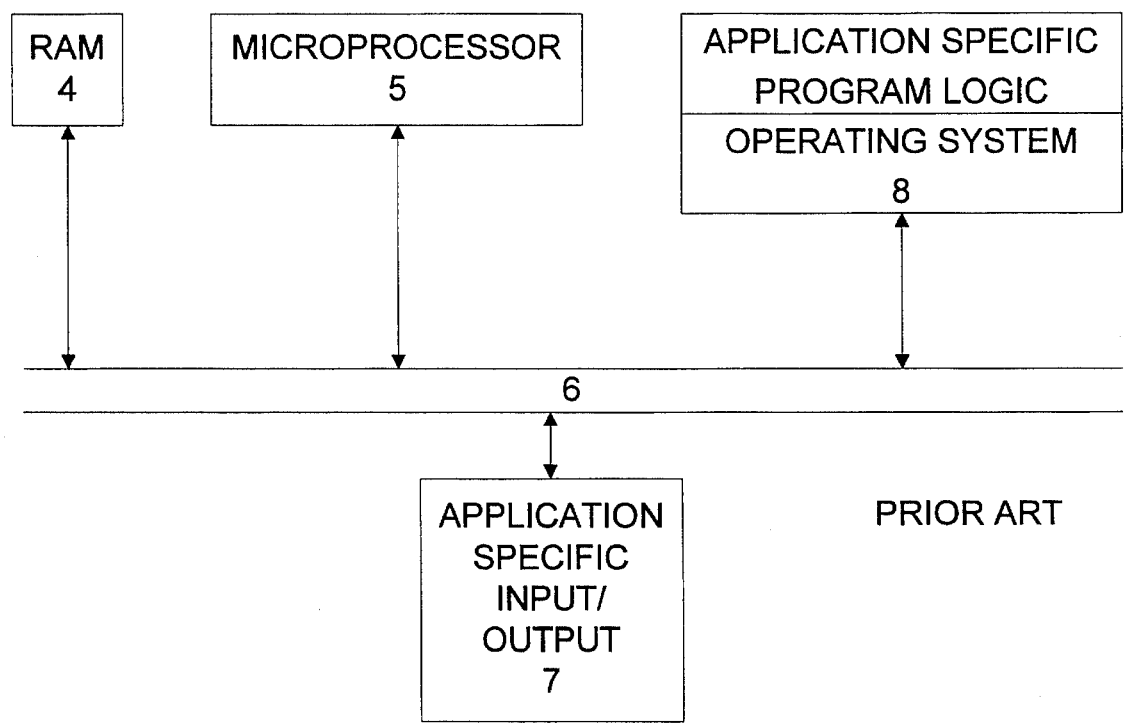
FIG. 2 is a detail of the conventional microprocessor controlled embedded system of FIG. 1.
Figure 3:
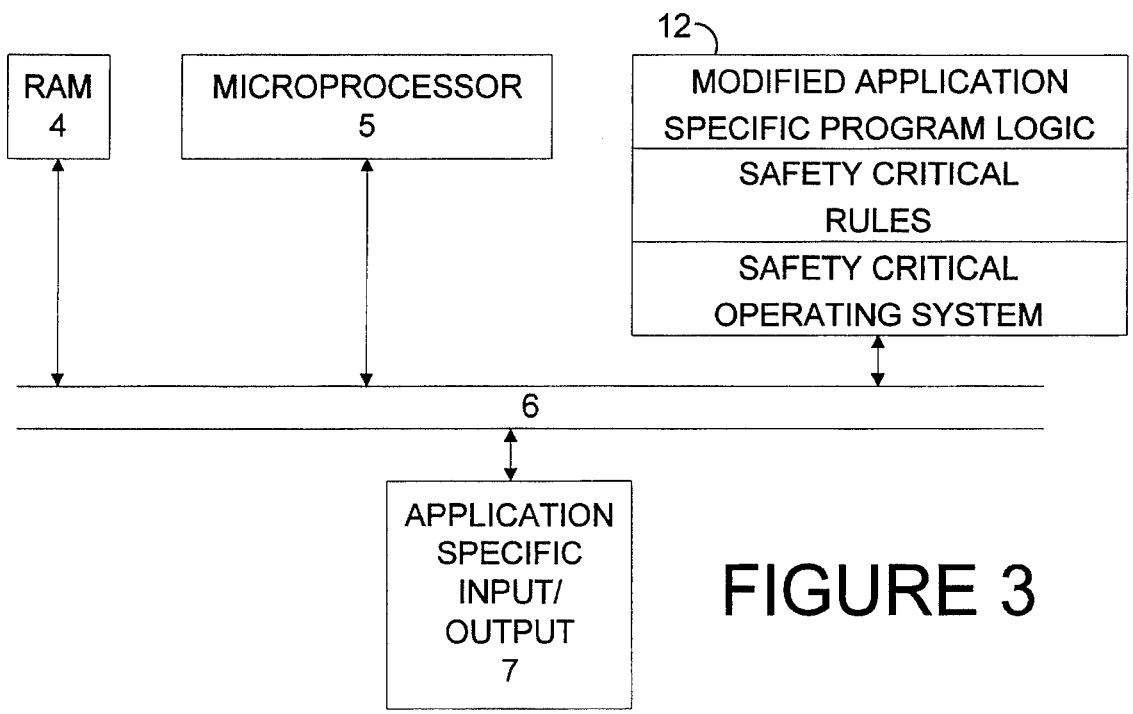
FIG. 3 is a schematic of one embodiment of a microprocessor controlled embedded system in accordance with the present invention.

FIG. 3 shows one embodiment of the safety critical monitoring system for the microprocessor controlled embedded system 2 of FIG. 1 and FIG. 2.

In accordance with the present invention, the microprocessor 5, which is the key element of the central processing unit, is the same microprocessor as in the conventional embedded system. The microprocessor can be any standard microprocessor or microcontroller, such as Intel 80386, 80486 and Pentium, Motorola 26xxxx, or the Power PC Processor. Similarly, the random access memory 4, which can be a dynamic or static semiconductor memory, is the same in the conventional system and in the present invention. The same is true for the bus 6 and the application specific input/output circuit 7.

The key features of the invention are contained in the embedded firmware of memory 12, which is a ROM or which is loaded into a non-volatile RAM which maintains its contents after the initial loading. Moreover, memory 12 can comprise more than one memory or more than one different type of memory and still be within the concepts of the present invention.

Memory 12 stores modified application specific program logic, which includes the conventional application specific program logic which include the instructions used to control the specific application system 1 in conjunction with the microprocessor 5 under the control of the operating system.

The safety critical operating system, which is also stored in memory 12, includes the basic operating system used in a conventional microprocessor controlled embedded system and thus has all of the functional elements for carrying out standard embedded executive functions, such as multitasking, memory management, scheduling, exception handling, interrupt handling and supervisory level operations. In addition, the safety critical operating system has a link to a defined set of safety critical rules stored in memory 12 and constituting part of the modified application specific program logic. The safety critical operating system verifies that each operation associated with those rules is performed as defined.

The safety critical operating system also differs from the standard operating system for an embedded system in its ability to monitor the modified application specific program logic in a time stealing mode to insure that the modified application program logic is the correct instruction set, that the use of RAM 4 is correct, that the instruction set of microprocessor 5 operates as defined and that the modified application specific program logic is cycling.

The modified application specific program logic need only differ from the conventional application specific program logic used for a controlled embedded system to include the safety critical rules and to include instructions to route all of its outputs via the safety critical operating system. In this way, the safety critical operating system can insure that no outputs are modified except with its own participation. Moreover, in the case where the rules define a correlation between the input and output, the safety critical operating system can monitor the associated inputs.

The safety critical rules that are supplied with the modified application specific program logic establish the level of safety criticality by setting forth which safety critical operations must be followed (see FIG. 4) and the limits imposed on those safety critical operations.

The rules set forth an evaluation of events that occur in the microprocessor controlled embedded system and by linking these rules to the operation of the safety critical operating system, the evaluation is tied to the event itself.

The safety critical rules include I/O limitations, requirements for I/O interactions at a gross level, requirements for I/O timing, requirements for I/O feedback, requirements for operational calculations and requirements for responses from the user interface, the specific application system and from the modified application specific program logic itself. The safety critical operating system can respond to a failure by causing a system or user alert or alarm and/or by forcing a set of outputs applied to bus 6 into a rule defined level, such as all zeroes or all ones.

The safety critical operating system can also perform all applicable testing of its own operation, to verify its own operation.

Figure 4:
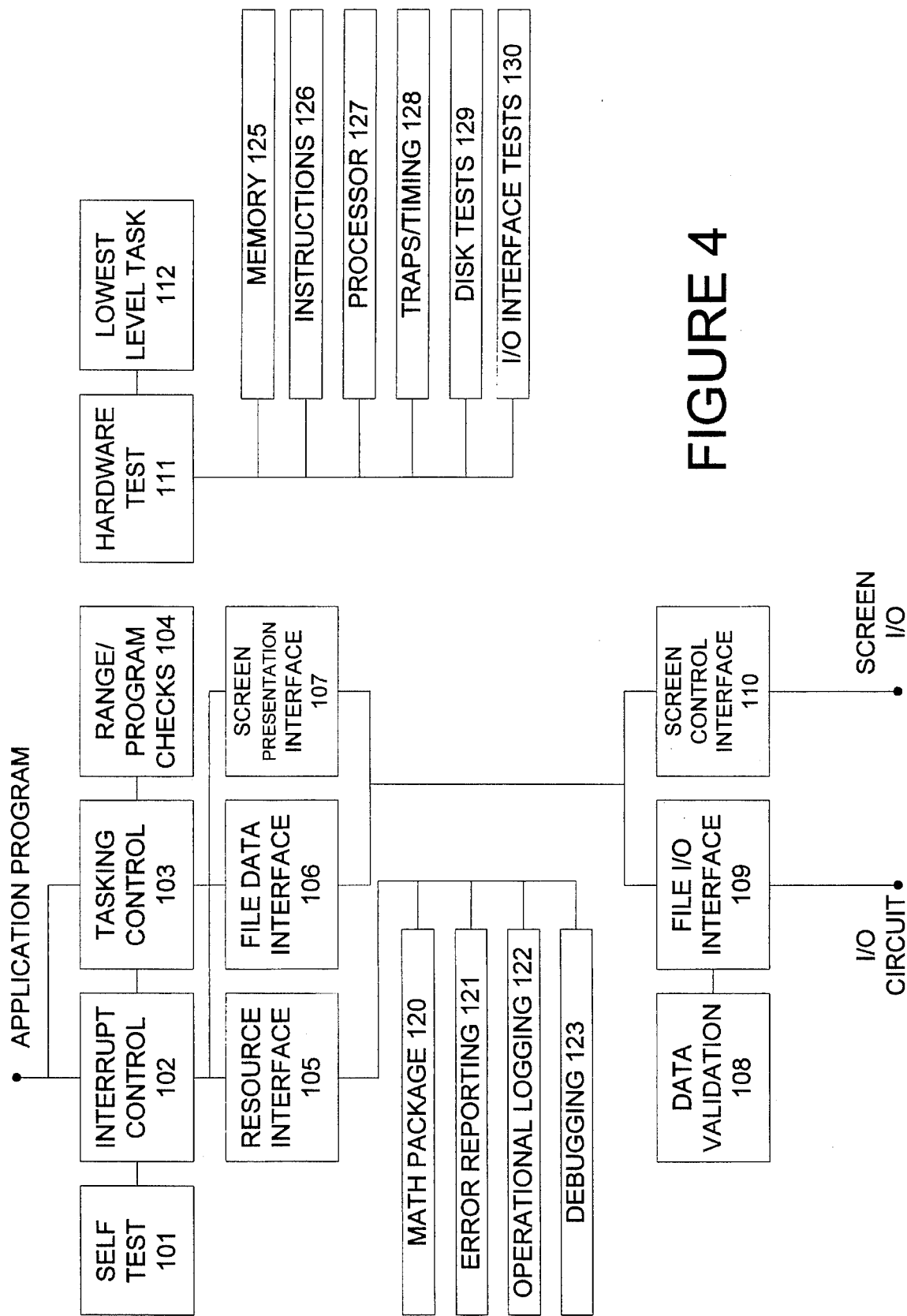
FIG. 4 is a diagram of the functions of the safety critical operating system of FIG. 3.

The functions of the safety critical operating system are shown in the block diagram of FIG. 4. As shown therein, the safety critical operating system has various functional blocks which carry out the safety critical functions defined by the safety critical rules.

Specifically, the safety critical operating system has an application program interface which interacts with the modified application specific program logic. The application interface includes interrupt controls 102 and tasking controls 103 and has a self-testing section 101 which acts to make sure that the operating system itself is operating properly and range and program checking 104 on the modified application specific program logic to check the integrity thereof according to the criteria set by the rule set. The application program interface operates in the foreground, whereas all of the other safety critical functions are operated in the background so that they are transparent.

The application interface interacts with a file data interface 106 and a screen presentation interface 107 as well as a resource interface 105.

The resource interface controls a math package 120 which insures that the accuracy of the embedded system is sufficient for the particular application system and the requirements of the rules set. Thus where typical accuracy is 8 bits, the math package 120 can provide up to 32 bits or more of accuracy if necessary. The error reporting section 121 provides an on the spot report of any error detected by the operating system. The operation logging section 122 keeps a record of all checking carried out by the operating system which can then be accessed from memory at a later time. Finally, the debugging section 123 acts to attempt to remove errors when recognized by the operating system.

The safety critical operating system also includes the file input/output interface 109 which interacts with the input/output circuit 7 to send and receive data to the user interface and to the specific application system. The data validation section 108 performs double copy compares for each read and write to the memory. The screen control interface 110 also interacts with the input/output circuit 7 and controls all data sent to the screen or display to insure that the display is accurate under the criteria of the rules set.

The operating system further includes a hardware testing section 111 which performs continuous hardware checking and validation, defined as the lowest level task in the system by section 112. The hardware testing section 111 includes a section 125 for testing memory, and performs a cyclical redundancy check on all data elements in memory. Section 126 checks the integrity of instruction registers and section 127 checks the integrity of the microprocessor in the system to insure that it is operating properly. The section 128 checks the traps and timing including the system clock to make sure they are operating correctly, section 129 tests disks and section 130 tests the I/O interface.

In use, the application program interface will interface all other facilities to the modified application specific program logic. The modified application specific program logic will request mathematical calculations, data read and/or write, activity logging or screen presentation and action initiation when a screen choice is made. The requests are accepted by the application program interface which then transfers the requests to the proper operating process within the operating system along with any required logging or checking action. Responses to the requested operation are returned by the application program interface to the modified application specific program logic.

For example, if there is a request to write a record to a file, this would cause the record to be transferred to operational logging 122 and to the file I/O interface 109. Additionally, the debugging section 123 is activated and the contents of the write are analyzed to determine if it contains the desired data. These safety critical functions are enabled in accordance with the rules set.

The self test 101 performs testing of the operating system itself. It causes sanity checks with each of the other processes through a defined protocol of information transfer and performs a cyclical redundancy check over the memory space occupied by the operating shell. This process performs its operations as frequently as required by the rules set by the modified application specific program logic. Thus, the greater the level of safety criticality, the more frequently the self-testing would be performed.

The range/program checks 104 perform data verifications of range, field type, etc., in accordance with the requirements set by the safety critical rules, on data that is operated on by the mathematical package 120 where data sent to or retrieved from the file I/O interface 109 and screen control interface 110. Additionally, this verifies the section of the modified application specific program logic accessed in memory by a cyclical redundancy check and by size validation.

The tasking control 103 acquires the application specific program logic and validates it using the range/program checks 104. It then logs its initiation in operational logging 122 and starts the application system. For application specific program logic keyed to screen responses, this process will acquire those sections and validate them prior to execution.

The file data interface 106 translates generic data read/write requests into the file activities contained in the file I/O interface 109. For example, when the modified application specific program logic requests the reading of a record in a database with a specific key, it will have that request translated to a series of commands required by an active random access keyed database program.

The screen presentation interface 107 translates a generic screen layout containing response keys and fields into the screen presentation activities contained in the screen control interface 110. Thus, a screen layout containing radio buttons or fields to be entered or selection buttons or action buttons is described by the modified application specific program logic and is then translated into a series of commands required by the user interface.

The data validation 108 adds a cyclical redundancy check to every written record and validates every record read when required by the rules set. It controls information to insure the data has not been modified or accidentally destroyed.

The file I/O interface 109 performs the actual calls for reading and writing to RAM 4. This will handle all random, keyed and sequential accessing of data and all formatting of the generic records into system dependent record requests. Additionally, the file I/O interface uses the data validation 108 to validate the data read and written to insure that data failures are recognized when required by the rules set.

The screen control interface 110 performs the actual calls for presenting screen displays to the user interface and for receiving response inputs from the user interface and application system. This handles the formatting of the generic screen and its presentation elements, such as radio buttons, menu selections, data fields, etc. which are compatible with the system's presentation method.

The resource interface 105 controls access to a set of capabilities offered by the operating system and which supports the operation of the modified application specific program logic. These capabilities include the math package 120, which supports statistical calculations and multiple accuracy calculations and insures that accuracy levels are consistent for application calculations that require specific calculation tolerances set by the safety critical rules. The error reporting 121 defines the method of reporting the shell determined errors. The operation logging 122 logs all desired activities and errors, and the debugging 123 allows the set of rules to define data conditions or error conditions and requests identification of where and when they occur, for aiding and determining problems with the application specific program logic.

The math package 120 offers a system independent set of math routines, which will support statistical operations and calculations requiring accuracy levels which are different with different platforms. The error reporting 121 passes all errors encountered and reports them to either the operational log 122 and/or the user in a consistent manner. The operational logging 122 generates an activity log which includes which segment of the application specific program logic was executing, data record modifications and/or access, screen presentations and operator responses, etc. This log is used for review by the user application of daily activities or can be used by a governing agency for verification of proper operation of a specific application system. A special signature can be recorded with the records to insure that the records have not been tampered with. The debugging 123 allows a set of criteria in the rules to be applied to dynamic operations of the application specific program logic in order to aid in identifying problems with the application system. These are recognition of incorrect data being written or read from the RAM, or a request for an incorrect screen presentation sequence.

The hardware testing 111 is an activity that occurs independently of the modified application specific program logic. The testing takes place on a time available basis to insure that the hardware is operating correctly. This includes a series of tests which verify the normal processing of the system and the integrity of the connected hardware.

The hardware testing includes memory testing 125 which insures that the RAM memory can be read and written with reliable retrieval of stored data. This operates in a non-destructive mode to insure no interference with application specific program logic operation and no interference with the operation of the specific application system. Instruction testing 126 tests each of the processor instructions in various orientations with known operants and compares the results of the operation with expected results in order to verify proper operation of the CPU and to insure proper execution of the modified application specific program logic. The processor testing 127 checks the processor dependent operations to also insure proper execution of modified application specific program logic. Traps/timing testing 128 checks the clock timing and interrupt actions wherever possible on a non-interference basis to insure that timed activities and interrupt driven activities are operating properly and within criteria set by the rules. Disk testing 129 checks the hard drive or main storage device controller and drives on a non-interference basis to insure that disk read, disk write, and seek operations are operating properly. The input/output interface tests 130 check all input/output interface circuits.

Figure 5:
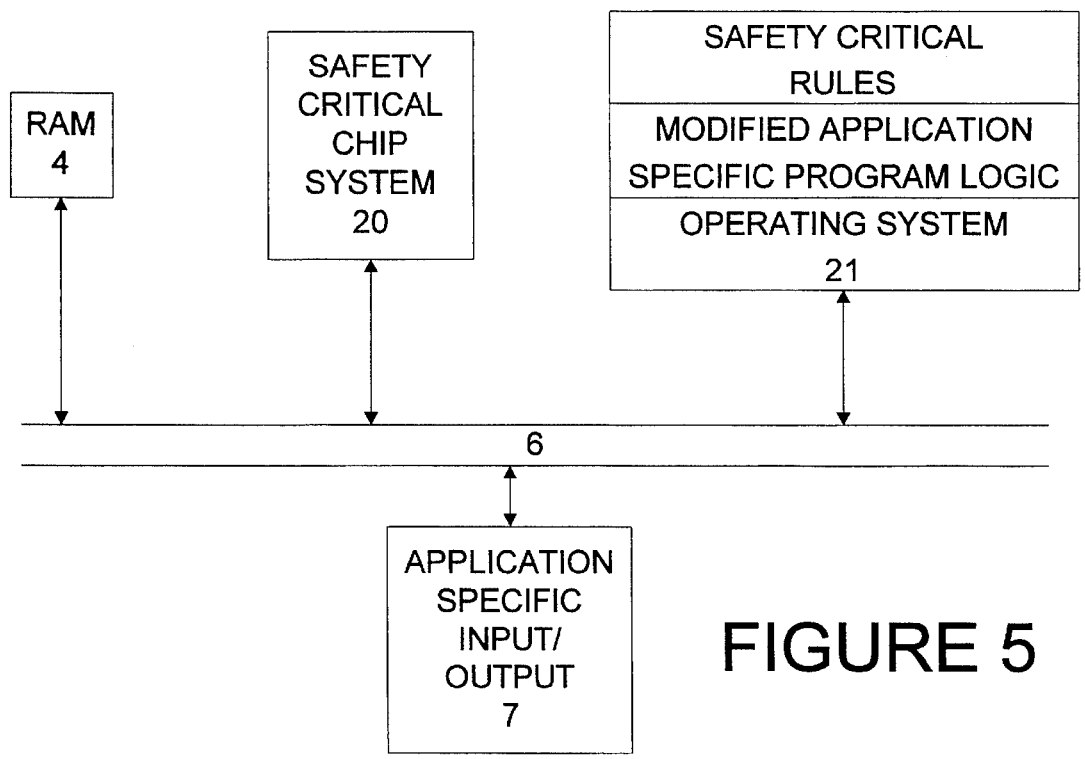
FIG. 5 is a schematic of another embodiment of the microprocessor controlled embedded system according to the present invention.
Figure 6:
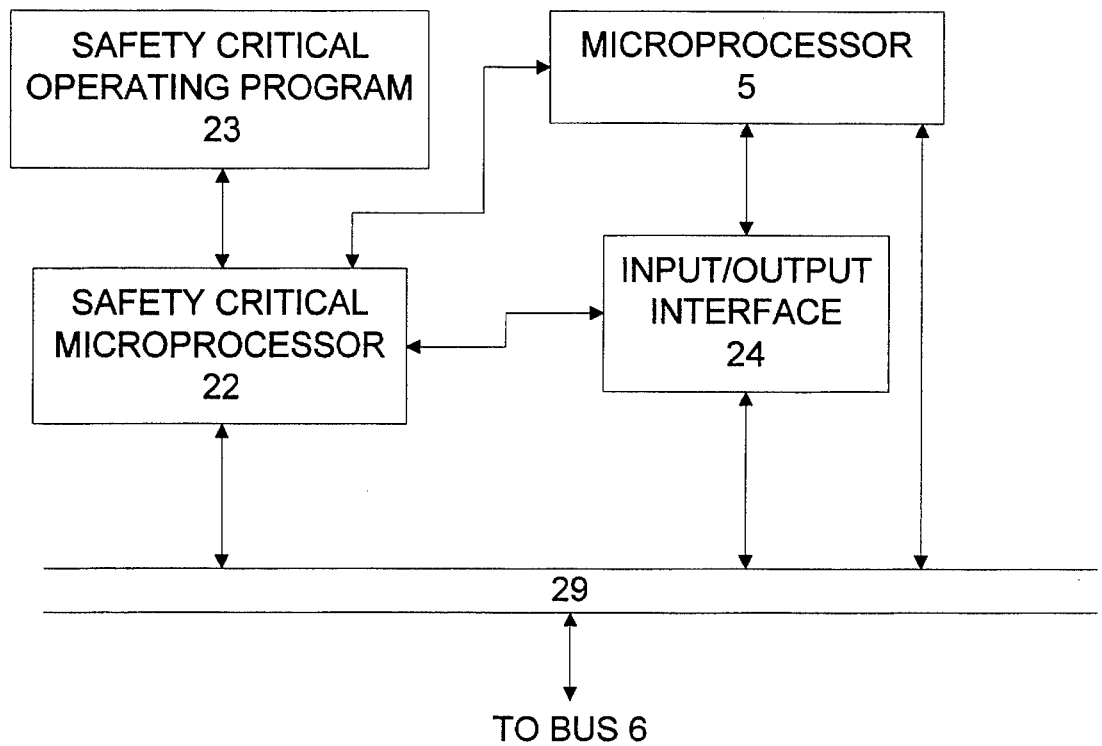
FIG. 6 is a schematic of the safety critical chip system shown in FIG. 5.
Figure 7:
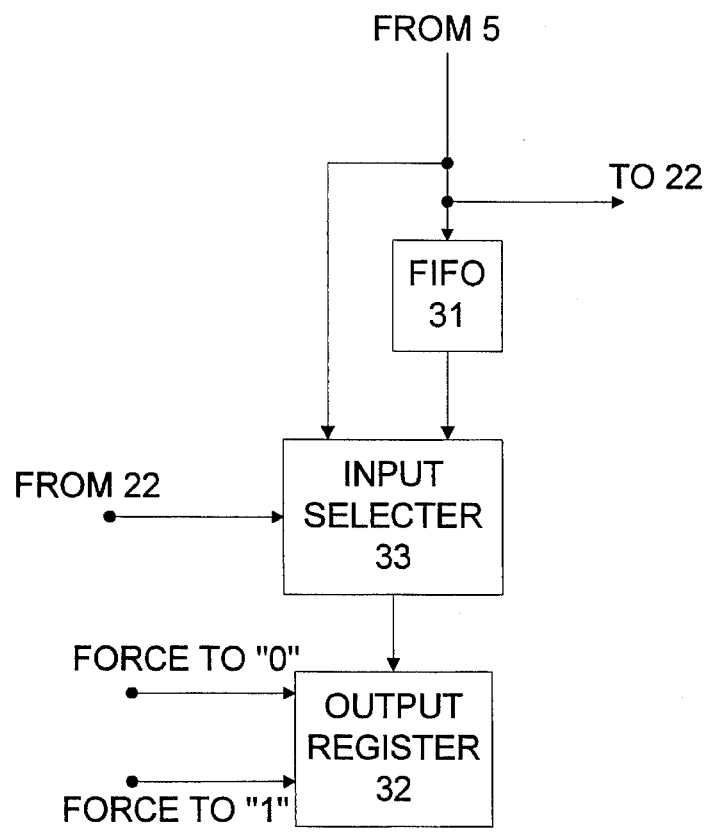
FIG. 7 is a circuit diagram of the input/output interface of FIG. 6.

FIGS. 5–7 illustrate another embodiment of the present invention wherein the microprocessor 5 is substituted with a pin-for-pin replacement safety critical CPU which forms a safety critical chip system according to the present invention. In this embodiment, the modified application specific program logic is stored in memory 21, similar to memory 12, with the sole modification to conventional application specific program logic being the addition of the safety critical rules explained with regard to the embodiment of FIG. 3. In this system, the operating system is also the same as that in a conventional microprocessor controlled embedded system, such as that shown in memory 8 of FIG. 2.

As shown in more detail in FIG. 6, the safety critical chip system includes the standard microprocessor 5 as well as a safety critical microprocessor 22, which can be the same type of device as microprocessor 5, but which has a safety critical operating instruction set program 23. The safety critical microprocessor 22 has the ability to control microprocessor 5 and has an associated input/output interface 24, which it controls and which sits between microprocessor 5 and bus 29 to control any data output to and from microprocessor 5. The microprocessors 5 and 22 also have direct access to bus 29 for other operations.

The safety critical chip system 20 is capable of accessing all memory accessible to the standard CPU in the embodiment of FIG. 2 and initially has enable and data control over all inputs and outputs via the input/output interface 24. The safety critical microprocessor 22 has a direct access to bus 29 in order to provide an alarm output capability for the system.

The safety critical operating program 23 in conjunction with the safety critical microprocessor 22 allows the safety critical chip system 20 to monitor the operating system and the application specific program logic in a transparent mode in order to insure that the operating system is the correct operating system, the modified application program logic that is loaded is the correct instruction set, the use of RAM 4 is correct, that the safety critical operating program operates as required by the rules, that the modified application specific program logic is cycling and that the operating system is cycling.

The safety critical microprocessor 22 insures that no data outputs are modified without its approval and where the safety critical rules define a correlation between the input and outputs, the safety critical microprocessor monitors the associated inputs.

The safety critical rules in this embodiment are selected from those described with respect to the embodiment of FIG. 3 and FIG. 4.

The safety critical microprocessor is also capable of responding to a failure by causing a system or user alert or alarm and/or by forcing a set of outputs to a rule defined level, such as all zeroes or all ones.

The safety critical microprocessor is capable of performing safety critical operations including requesting the microprocessor 5 to perform a particular instruction and supply the result via an interrupt request, request the microprocessor 5 to write and access RAM via an interrupt, inhibit the activity of the microprocessor 5, inhibit the outputs to bus 29, force the output levels to bus 29 to either a zero or a one, perform a cyclical redundancy check of the operating system, the modified application specific program logic and the safety critical operating program, verify that the modified application specific program logic and the operating system are cycling and perform self-testing.

Additionally, in cases where the outputs require specific sequences which can occur in rapid succession or whose occurrence can cause significant safety problems, the safety critical processor utilizes the input/output interface 24 to cause the specified output to be connected via a controlled delay. As shown in FIG. 7, the output goes to a first-in/first-out register (FIFO) 31, which allows a delay between the output from the microprocessor 5 to the actual physical output at bus 29 and to permit the safety critical microprocessor to validate the information without causing a disruption in the program sequence of activity. The safety critical microprocessor 22 can control the input selector 33 to select either the data directly from microprocessor 5 so that there is no delay for the data from microprocessor 5 to output register 32 or to select the output from the FIFO 31, which imposes its own delay. The output from the microprocessor 5 is applied to safety critical microprocessor 22 for validation. Moreover, the safety critical microprocessor 22 controls output register 32 to force the data thereat to either zero or one as required in order to either inhibit or force the levels to a rule defined level.

The use of the FIFO 31 preserves the data and time of occurrence and insures that the sequential nature of the data is unchanged.

It is understood that the embodiments described hereinabove are merely illustrative and are not intended to limit the scope of the invention. It is realized that various changes, alterations, rearrangements and modifications can be made by those skilled in the art without substantially departing from the spirit and scope of the present invention.

What is claimed is:

1. A safety critical monitoring system for a microprocessor controlled embedded system, comprising:

a central processing unit comprising a microprocessor and a non-volatile memory accessible by the microprocessor and having an operating system stored therein for performing application specific embedded executive functions and application specific program logic stored therein for controlling an application system;

an input/output circuit for providing an interface between the central processing unit and the application system;

wherein the application specific program logic includes a defined set of safety critical rules for the application system corresponding to criteria for safety critical operations to be performed by the microprocessor in accordance with the application specific program logic; and wherein the operating system has means linked to the stored set of safety critical rules for verifying that the safety critical operations performed by the microprocessor in accordance with the application specific program logic meet the criteria set by the safety critical rules and means for indicating a failure to meet said criteria.

2. The system according to claim 1, wherein the embedded executive functions comprise at least one of multitasking, memory management, scheduling, exception handling, interrupt handling and supervisory level operations.

3. The system according to claim 1, wherein the operating system has means for verifying outputs prior to being applied to the input/output circuit.

4. The system according to claim 1, wherein the defined set of safety critical rules comprises at least one of input/output limitations, input/output interactions, input/output timing, input/output feedback, operational calculations and application system responses.

5. The system according to claim 1, wherein the operating system has means for monitoring itself during use.

6. A safety critical monitoring method for a microprocessor controlled embedded system, comprising the steps of:

providing a central processing unit having a microprocessor and a non-volatile memory accessible by the microprocessor;

storing an operating system in the memory for performing application specific embedded executive functions and storing application specific program logic in the memory for controlling an application system;

providing an interface between the central processing unit and the application system through an input/output circuit;

wherein the application specific program logic includes a defined set of safety critical rules for the application system corresponding to criteria for safety critical operations to be performed by the microprocessor in accordance with the application specific program logic;

linking the operating system to the stored set of safety critical rules to verify that the safety critical operations performed by the microprocessor in accordance with the application specific program logic meet the criteria set by the safety critical rules; and indicating a failure to meet said criteria.

7. The method according to claim 6, wherein the embedded executive functions comprise at least one of multitasking, memory management, scheduling, exception handling, interrupt handling and supervisory level operations.

8. The method according to claim 6, further comprising verifying outputs prior to being applied to the input/output circuit.

9. The method according to claim 6, wherein the defined set of safety critical rules comprises at least one of input/output limitations, input/output interactions, input/output timing, input/output feedback, operational calculations and application system responses.

10. The method according to claim 6, wherein the operating system monitors itself during use.

11. A safety critical monitoring system for a microprocessor controlled embedded system, comprising:

a central processing unit comprising safety critical microprocessing means and a non-volatile memory accessible by the microprocessing means and having an operating system stored therein for performing application specific embedded executive functions and application specific program logic stored therein for controlling an application system;

an input/output circuit for providing an interface between the central processing unit and the application system;

wherein the safety critical microprocessing means comprises a first microprocessor for performing the application specific embedded executive functions, a safety critical microprocessor for performing safety critical operations and an input/output interface circuit responsive to the safety critical microprocessor for controlling data from the first microprocessor to the input/output circuit;

wherein the application specific program logic includes a defined set of safety critical rules for the application system corresponding to criteria for the safety critical operations to be performed by the safety critical microprocessor in accordance with the application specific program logic; and wherein the safety critical microprocessor has a stored safety critical operating program linked to the stored set of safety critical rules for verifying that the safety critical operations performed by the safety critical microprocessor meet the criteria set by the safety critical rules and means for indicating a failure to meet said criteria.

12. The system according to claim 11, wherein the embedded executive functions comprise at least one of multi-tasking, memory management, scheduling, exception handling, interrupt handling and supervisory level operations.

13. The system according to claim 11, wherein the safety critical microprocessing means has means for verifying outputs prior to being applied to the input/output circuit.

14. The system according to claim 13, wherein the means for verifying outputs comprises a first-in first-out register for delaying outputs to the input/output circuit.

15. The system according to claim 11, wherein the defined set of safety critical rules comprises at least one of input/output limitations, input/output interactions, input/output timing, input/output feedback, operational calculations and application system responses.

16. The system according to claim 11, wherein the safety critical microprocessor has means for monitoring itself during use.

17. A safety critical monitoring method for a microprocessor controlled embedded system, comprising the steps of:

providing a central processing unit comprising safety critical microprocessing means and a non-volatile memory accessible by the microprocessing means storing an operating system in the memory for performing application specific embedded executive functions and storing application specific program logic in the memory for controlling an application system;

providing an interface between the central processing unit and the application system through an input/output circuit;

wherein the safety critical microprocessing means comprises a first microprocessor for performing the application specific embedded executive functions, a safety critical microprocessor including a stored safety critical operating program for performing safety critical operations and an input/output interface circuit responsive to the safety critical microprocessor for controlling data from the first microprocessor to the input/output circuit;

wherein the application specific program logic includes a defined set of safety critical rules for the application system corresponding to criteria for the safety critical operations to be performed by the safety critical microprocessor in accordance with the application specific program logic; and linking the safety critical microprocessor safety critical operating program to the stored set of safety critical rules for verifying that the safety critical operations performed by the safety critical microprocessor meet the criteria set by the safety critical rules; and indicating a failure to meet said criteria.

18. The method according to claim 17, wherein the embedded executive functions comprise at least one of multi-tasking, memory management, scheduling, exception handling, interrupt handling and supervisory level operations.

19. The method according to claim 17, wherein the safety critical microprocessing means verifies outputs prior to being applied to the input/output circuit.

20. The method according to claim 19, wherein the step of verifying outputs comprises delaying outputs to the input/output circuit in a first-in first-out register.

21. The method according to claim 17, wherein the defined set of safety critical rules comprises at least one of input/output limitations, input/output interactions, input/output timing, input/output feedback, operational calculations and application system responses.

22. The method according to claim 17, wherein the safety critical microprocessor monitors itself during use.

* * * * *